(12) United States Patent
Takeuchi et al.

(10) Patent No.: US 6,781,764 B1
(45) Date of Patent: Aug. 24, 2004

(54) OBJECTIVE LENS FOR OPTICAL PICK-UP

(75) Inventors: Shuichi Takeuchi, Saitama-ken (JP); Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/298,611

(22) Filed: Nov. 19, 2002

(30) Foreign Application Priority Data

Nov. 20, 2001 (JP) .................................... 2001-354887

(51) Int. Cl.⁷ .............................................. G02B 27/14
(52) U.S. Cl. ..................... 359/629; 359/719; 359/721; 359/722; 369/112.23
(58) Field of Search ................................ 359/629, 634, 359/722, 742; 369/112.23, 112.25

(56) References Cited

U.S. PATENT DOCUMENTS

| 5,703,856 | A | 12/1997 | Hayashi et al. |
| 5,838,496 | A | 11/1998 | Maruyama et al. |
| 5,912,868 | A | 6/1999 | Hayashi et al. |
| 6,088,322 | A | 7/2000 | Broome et al. |
| 6,118,594 | A | 9/2000 | Maruyama |
| 6,191,889 | B1 | 2/2001 | Maruyama |
| 6,473,387 | B1 | 10/2002 | Maruyama et al. |
| 6,480,344 | B1 * | 11/2002 | Maruyama ................... 359/721 |
| 6,545,821 | B2 * | 4/2003 | Katsuma ..................... 359/721 |

FOREIGN PATENT DOCUMENTS

JP          9-306023           11/1997

* cited by examiner

Primary Examiner—Scott J. Sugarman
Assistant Examiner—Darryl J. Collins
(74) Attorney, Agent, or Firm—Greenblum & Bernstein, P.L.C.

(57) ABSTRACT

An optical system of an optical pick-up includes a light source portion that selectively emits a first laser beam (shorter wavelength) and a second laser beam (longer wavelength), and an objective lens for converging the first laser beam onto a first optical disc and for converging the second laser beam onto a second optical disc. The second optical disc has lower recording density and a thicker cover layer than the first optical disc. The divergence of the second laser beam incident on the objective lens is larger than that of the first laser beam, correcting one part of spherical aberration caused by a difference in thickness of the cover layer. A diffractive lens structure is formed on a surface of the refractive lens so that the residual part of the spherical aberration is corrected by switching the wavelength of the laser beam.

10 Claims, 9 Drawing Sheets

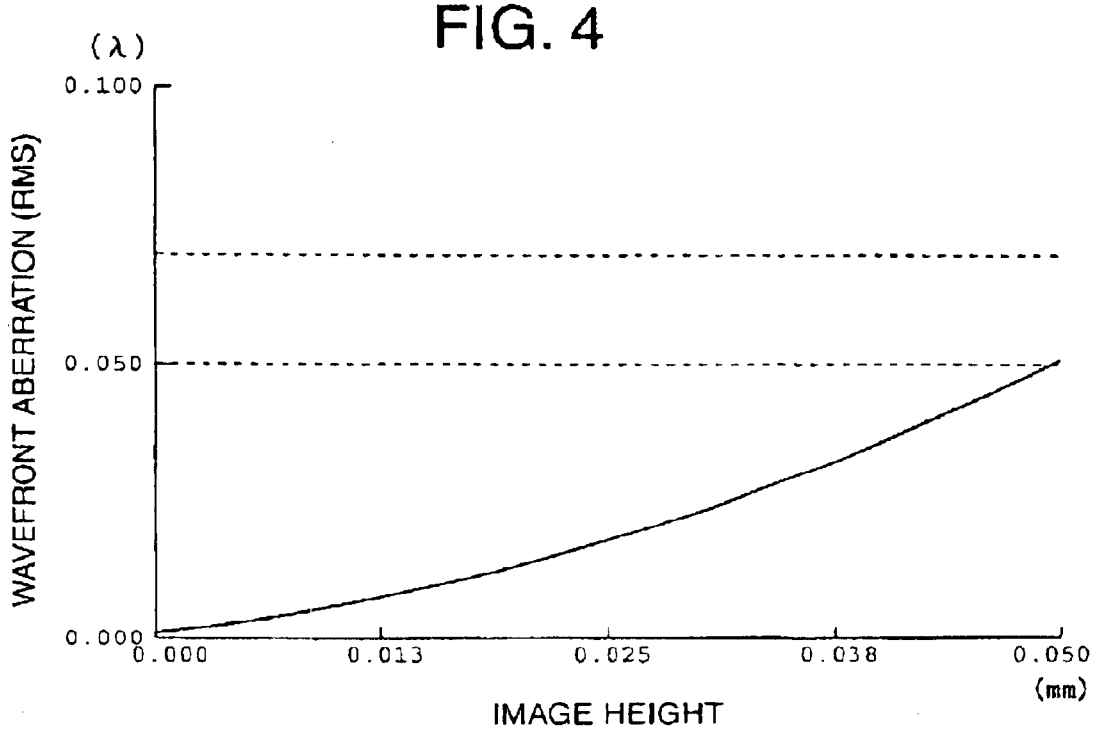
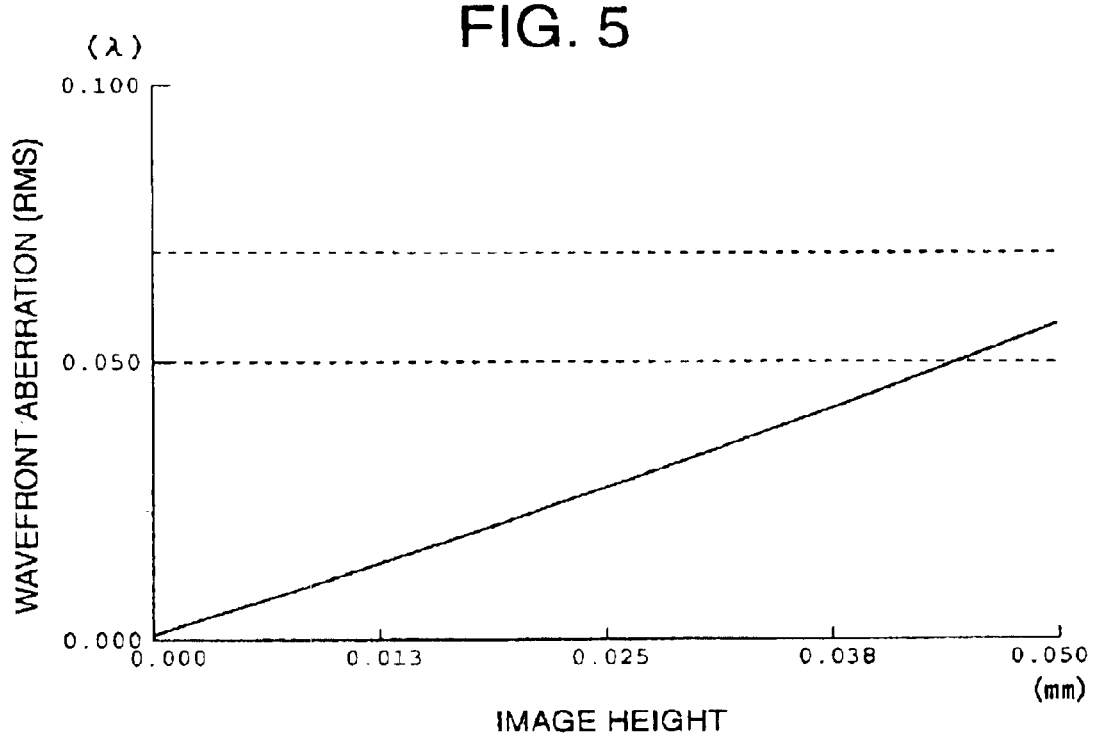

OBJECTIVE LENS FOR OPTICAL PICK-UP

BACKGROUND OF THE INVENTION

The present invention relates to an optical system for an optical pick-up that is capable of using a plurality of kinds of optical discs whose thicknesses of cover layers are different from each other. Particularly, the present invention relates to an optical system whose objective lens has a diffractive lens structure.

The optical disc has an information layer, on which digital information is recorded, and a transparent cover layer, which covers the information layer.

There are several types of optical discs whose cover layers have different thickness. For example, the thickness of the cover layer of a compact disc (CD) or a CD-recordable (CD-R) is 1.2 mm, and that of a digital versatile disc (DVD) is 0.6 mm.

Due to the difference in thickness of the cover layers, when an optical disc placed on a turn table of a disc drive is replaced with another type optical disc, the distance between the optical pick-up and the information layer changes.

An optical pick-up typically includes a light source for emitting a laser beam, an objective lens for converging the laser beam onto an information layer of an optical disc through a cover layer thereof, and a light detector for receiving a reflected laser beam from the optical disc to detect signals. In some optical pick-ups compatible with a plurality of types of optical discs, a plurality of independent optical systems for respective types of optical discs are provided. However, for a compact design of an optical pickup, it is required that the number of optical components is reduced, and therefore, it is desirable to use a common objective lens which can be used for a plurality of types of optical discs.

When the common objective lens is employed, by moving the objective lens in the optical axis direction, a paraxial beam waist (a beam spot) position can be changed so as to meet the thickness of the cover layer. However, the difference in thickness of the cover layer changes spherical aberration. If only the objective lens is moved when the disc is replaced with the different type disc, wavefront aberration of the laser beam becomes large. For instance, when the objective lens, which is designed to minimize the spherical aberration for a DVD, is used for readout of the information from a CD, the spherical aberration becomes too large to reproduce the information even if the objective lens is moved to place the beam spot on the information layer of the CD.

A method has been known in which the degree of convergence/divergence of a beam incident on the objective lens is changed according to the type of the optical disc (CD or DVD), thereby correcting the spherical aberration caused by the difference in thickness of the cover layer. In such a case, a distance from a light emission point to the objective lens for a CD should be shorter than a distance from the light emission point to the objective lens for a DVD. With this configuration, the laser beam for the CD is incident on the objective lens as a divergent beam and the laser beam for a DVD is incident on the objective lens as a parallel-light beam.

It has also been known to form a diffractive lens structure on a surface of an objective lens to compensate for a change of spherical aberration due to the difference of the thickness of the cover layers. Since the diffractive lens structure exhibits a wavelength dependence, a change of spherical aberration due to a difference in thickness of the cover layers can be compensated for by changing a wavelength of the laser beam.

However, when the degree of convergence/divergence is varied to correct spherical aberration caused by the difference in thickness of the cover layer, off-axis aberration becomes larger for at least one of a CD and a DVD. Accordingly, if it becomes necessary to use an off-axis beam due to a lens shift in tracking operation and/or an angle error or a position error in assembling, relatively large aberration mainly including coma is generated.

If the spherical aberration is corrected by employing the diffractive lens structure without changing divergence/convergence of the laser beam incident on the objective lens, a back focus remains substantially unchanged regardless of the types of the optical discs. In this case, a working distance for a CD or a CD-R, which has a thicker cover layer, is shortened.

SUMMARY OF THE INVENTION

The present invention is advantageous in that there is provided an optical system for an optical pick-up, which is capable of recording/reproducing data to/from a plurality of kinds of optical discs having cover layers of different thicknesses, such as a CD and a DVD, that exhibits excellent off-axis performance and keeps a sufficient working distance even for an optical disc having a thicker cover layer such as a CD or a CD-R.

According to an aspect of the invention, there is provided an optical system for an optical pick-up, the optical system is provided with a light source portion that selectively emits a first laser beam and a second laser beam whose wavelength is longer than that of the first laser beam, and an objective lens for converging the first laser beam onto an information layer of a first optical disc through a cover layer thereof and for converging the second laser beam onto an information layer of a second optical disc through a cover layer thereof. The second optical disc has lower recording density and a thicker cover layer than the first optical disc.

Further, the light source portion is designed such that the divergence of the second laser beam incident on the objective lens is larger than that of the first laser beam, correcting one part of spherical aberration caused by a difference in thickness of the cover layer.

At least one surface of the objective lens is divided into a central area through which a laser beam of low NA, which is necessary and sufficient for the second optical disc, passes and a peripheral area through which a laser beam of high NA, which is necessary only for the first optical disc, passes. A diffractive lens structure that changes spherical aberration in accordance with wavelength is formed within at least the central area so that the residual part of the spherical aberration caused by the difference in thickness of the cover layer is corrected by switching the wavelength of the laser beam.

With this construction, one part of the spherical aberration caused by the difference in thickness of the cover layer is corrected by changing the divergence of the laser beam, i.e., by changing the imaging magnification of the objective lens, and the residual spherical aberration is corrected by the wavelength dependence of the diffractive lens structure. Therefore, the spherical aberration can be corrected while keeping off-axis performance well. Further, the divergence of the second laser beam is larger than that of the first laser beam, which increases a back focus when the second optical disc is used, reducing a variation between the working distance for the first optical disc and the working distance for the second optical disc.

The objective lens preferably satisfies the condition (1):

$$0.01 < \Delta SA \cdot (f_I/\phi_2)^2 < 0.03 \qquad (1)$$

where $\Delta SA$ is the residual spherical aberration (unit: mm) at the edge of the effective diameter in the central area when the laser beam whose wavelength is equal to the first laser beam and whose divergence is equal to the second laser beam is incident on the second optical disc;

$f_I$ is a focal length (unit: mm) of the objective lens at the wavelength of the first laser beam, and $\phi_2$ is the maximum diameter (unit: mm) of the central area.

An additional optical path length added by the diffractive lens structure is expressed by the following optical path difference function $\Phi(h)$:

$$\Phi(h) = (P_2 h^2 + P_4 h^4 + P_6 h^6 + \ldots) \times k \times \lambda$$

where $P_2$, $P_4$ and $P_6$ are coefficients of second, fourth and sixth orders;

h is a height from the optical axis;

k is a diffraction order; and $\lambda$ is a working wavelength.

It is preferable that the following conditions (2) and (3) are satisfied;

$$-180 < (P_4 \cdot f_I^4)/k < -60 \qquad (2).$$

$$0.02 < (m_1 - m_2) \cdot f_I < 0.15 \qquad (3)$$

where $m_1$ is the imaging magnification of the objective lens when the first optical disc is used; and $m_2$ is the imaging magnification of the objective lens when the second optical disc is used.

DESCRIPTION OF THE ACCOMPANYING DRAWINGS

FIG. 4 is a graph showing wavefront aberration of the optical system of the optical pick-up according to the first embodiment with the first optical disc;

FIG. 5 is a graph of wavefront aberration of the optical system of the optical pick-up according to the first embodiment with the second optical disc;

DESCRIPTION OF THE EMBODIMENTS

Embodiments according to the present invention will be described hereinafter with reference to the accompanying drawings.

Figure 1:
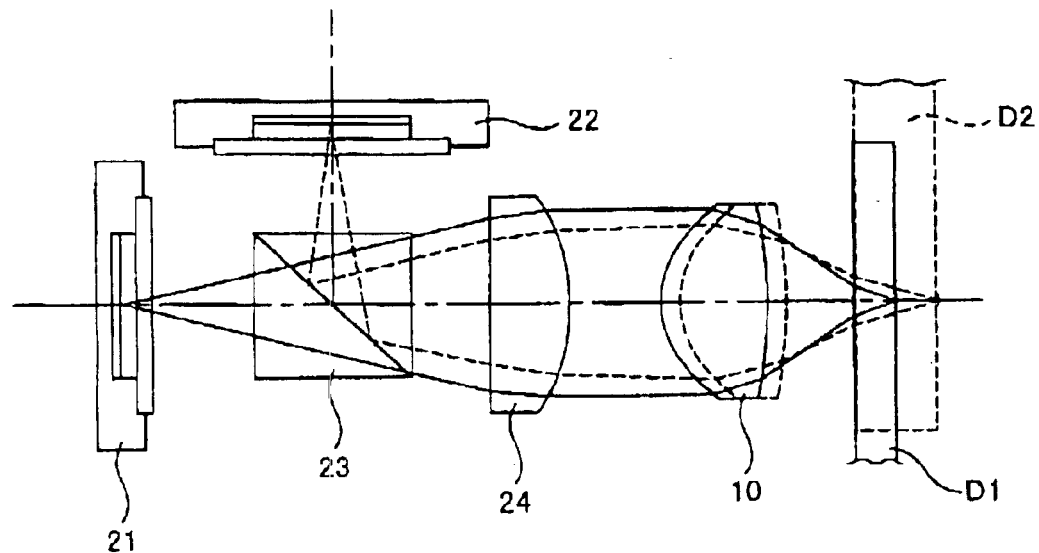
FIG. 1 shows an optical system for an optical pick-up embodying the present invention.

FIG. 1 shows an optical system of an optical pick-up according to an embodiment of the present invention. The optical system includes a first laser module 21, a second laser module 22, a beam combiner 23, a collimating lens 24 and an objective lens 10. Each of the first laser module 21 and the second laser module 22 is configured to have integrated laser diode and sensor.

The optical pick-up is compatible between a first optical disc such as a DVD and a second optical disc such as a CD or a CD-R. The first optical disc has a higher recording density, and, in this embodiment, the thickness of the cover layer thereof is 0.6 mm. The second optical disc has lower recording density and, in this embodiment, the thickness of the cover layer thereof is 1.2 mm. In order to form a fine beam spot on the first optical disc, a red light whose wavelength range is from 635 nm to 665 nm is required. The second optical disc requires a relatively larger beam spot and, in particular, a CD-R requires near-infrared radiation about 780 nm due to its spectral reflectance. Accordingly, the first laser module 21 includes a laser diode whose emission wavelength is 660 nm, and the second laser module 22 has a laser diode whose emission wavelength is 780 nm.

When the first optical disc $D_1$ (shown by a solid line) is used, the first laser module 21 is operated. Since the beam emission point of the first laser module 21 is coincident with a focal point of the collimating lens 24, a first laser beam at a wavelength of 660 nm emitted from the laser diode of the first laser module 21 is collimated by the collimating lens 24 as shown by a solid line and is incident on the objective lens 10 located at a position shown by a solid line. The objective lens 10 converges the incident first laser beam onto the recording layer of the first optical disc $D_1$ to form a beam spot thereon.

When the second optical disc $D_2$ (shown by a dotted line) is used, the second laser module 22 is operated. Since the emission point of the second laser module 22 is close to the objective lens 10 with respect to the focal point of the collimating lens 24, a second laser beam at a wavelength of 780 nm emitted from the laser diode of the second laser module 22 becomes a divergent beam through the collimating lens 24 as shown by a dotted line and is incident on the objective lens 10 located at a position closer to the optical disc as shown by a dotted line. The objective lens 10 converges the incident second laser beam onto the recording layer of the second optical disc $D_2$ to form a beam spot thereon.

The laser beam reflected from each optical disc is received by a sensor provided on each module. The sensor outputs a focusing error signal, a tracking error signal, and a reproducing signal of the recorded information during reproducing.

If the divergence of the laser beam when the second optical disc is used is larger than that when the first optical disc is used, apart of spherical aberration caused by a difference in thicknesses of the cover layers of the first and second optical discs can be corrected. Further, the back focus for the second optical disc can be made greater, which increases a distance from the objective lens 10 to the beam spot, and provides a sufficient working distance for the second optical disc, which tends to be shorter due to a thicker cover layer.

Figure 2A:
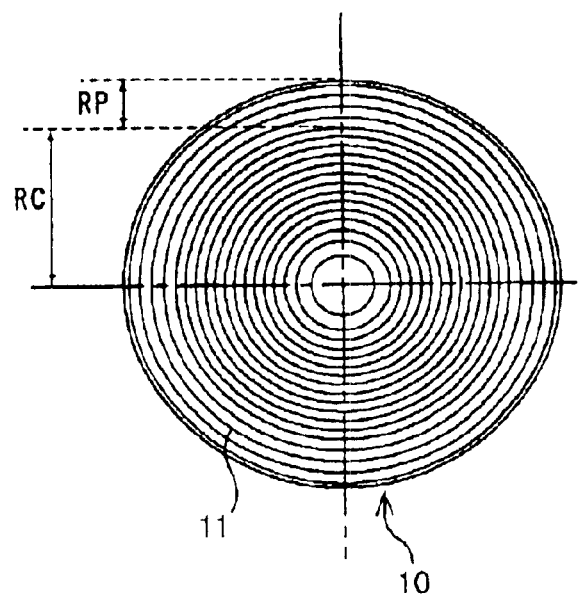
FIGS. 2A, 2B and 2C are a front view, a cross-sectional view and a partially enlarged view of an objective lens shown in FIG. 1, respectively.
Figure 2B:
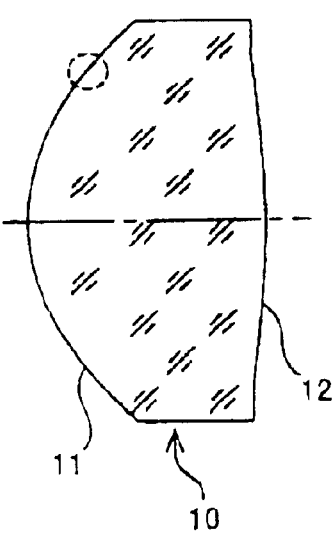
Figure 2C:
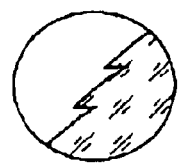

The construction of the objective lens 10 will be described in detail with reference to FIGS. 2A, 2B and 2C. FIG. 2A is a front view of the objective lens 10, FIG. 2B is a cross-sectional view and FIG. 2C is a partially enlarged view of FIG. 2B.

The objective lens 10 is a biconvex plastic lens having first and second aspherical surfaces 11 and 12. The first surface 11 of the objective lens 10 is divided into: (a) a central area RC through which a laser beam of low NA, which is necessary and sufficient for the second optical disc $D_2$ having low recording density, passes; and (b) a peripheral area RP through which a laser beam of high NA, which is necessary only for the first optical disc $D_1$ having high recording density, passes. The central area RC is inside the circle where a laser beam whose NA is about 0.45 through 0.50 passes, and the peripheral area RP surrounds the central area RC and is inside of the circle where a laser beam whose NA is about 0.60 passes.

A diffractive lens structure having a plurality of concentric annular zones is formed over the entire area including the central area RC and the peripheral area RP of the first surface 11 as shown in FIG. 2A. The diffractive lens structure has minute steps in an optical axis direction at the boundaries between the adjacent annular zones as shown in FIG. 2C. The second surface 12 is formed as a continuous surface without steps.

The diffractive lens structure formed in the central area RC of the first surface 11 is configured to provide the spherical aberration, which exhibits a wavelength dependence such that the spherical aberration changes in the undercorrected direction as the wavelength increases, and the spherical aberration changes in the overcorrected direction as the thickness of the cover layer increases.

A shorter wavelength laser beam is used for the first optical disc $D_1$ having a thinner cover layer, and a longer wavelength laser beam is used for the second optical disc $D_2$ having a thicker cover layer. Therefore, the change of the spherical aberration due to a change of the thickness of the cover layer is counterbalanced by the change of the spherical aberration due to the change of the wavelength.

In this embodiment, a part of the spherical aberration caused by the difference in thickness of the cover layer is corrected by changing the divergence of the laser beam incident on the objective lens, i.e., by changing the imaging magnification of the objective lens. Therefore the diffractive lens structure is to be configured to correct for the residual spherical aberration.

The diffractive lens structure formed in the peripheral area RP is configured to correct for the spherical aberration when the first laser beam is converged onto the first optical disc $D_1$ and generates the spherical aberration when the second laser beam is converged onto the second optical disc $D_2$.

Accordingly, when the first optical disc $D_1$ is used, the first laser beams passing through both of the central area RC and the peripheral area RP are converged at the same point on the information layer of the first optical disc $D_1$, which forms a small beam spot because of a relatively high NA. When the second optical disc $D_2$ is used, the second laser beam passing through the central area RC is converged onto the information layer of the second optical disc $D_2$, while the second laser beam passing through the peripheral area RP is diffused. Thus, when the second beam is used, the NA becomes smaller, which forms a larger beam spot.

The objective lens 10 is configured to satisfy the condition (1):

$$0.01 < \Delta SA \cdot (f_I/\phi_2)^2 < 0.03 \qquad (1)$$

where, $\Delta SA$ is the residual spherical aberration (unit: mm) at the edge of the effective diameter in the central area RC when the laser beam, whose wavelength is equal to the first laser beam and whose divergence is equal to the second laser beam, is incident on the second optical disc;

$f_I$ is a focal length (unit: mm) of the objective lens for the wavelength of the first laser beam; and $\phi 2$ is the maximum diameter (unit: mm) of the central area RC.

The condition (1) defines a correction amount of the spherical aberration by changing the distance to the beam emission point, i.e., by changing imaging magnification. Spherical aberration of the refractive lens caused by a difference between the wavelength of the first laser beam and the wavelength of the second laser beam is relatively small. Therefore, the spherical aberration provided by the optical system that is corrected in spherical aberration for the first optical disc when the second optical disc is used is determined mainly by the difference in thickness of the cover layer and the NA. If the thus provided spherical aberration is completely corrected for by changing the distance to the emission point, when a laser beam whose wavelength is equal to the first laser beam and whose divergence is equal to the second laser beam (at the imaging magnification for the second optical disc) is converged onto the second optical disc, the spherical aberration will not be generated.

If the spherical aberration caused by the change of the thickness of the cover layer is corrected for by the change of the distance to the beam emission point, the off-axis performance is significantly deteriorated as described above. Therefore, the optical system of the embodiment is configured such that the correction effect of the spherical aberration is achieved by both the change of the distance to the beam emission point and the diffractive lens structure. In such a design, the spherical aberration remains when the laser beam whose wavelength is equal to the first laser beam and whose divergence is equal to the second laser beam (at the imaging magnification for the second optical disc) is converged onto the second optical disc. The condition (1) defines an appropriate range of the residual spherical aberration. If the condition (1) is satisfied, the off-axis aberration can be reduced for both the first and second optical discs.

An additional optical path length added by the diffractive lens structure formed on the first surface 11 of the objective lens 10 is expressed by the following optical path difference function Φ(h):

$$\Phi(h) = (P_2 h^2 + P_4 h^4 + P_6 h^6 + \ldots) \times k \times \lambda$$

where $P_2$, $P_4$ and $P_6$ are coefficients of second, fourth and sixth orders, h is a height from the optical axis, k is a diffraction order and λ is a working wavelength. The optical path difference function Φ(h) represents an optical path difference between an imaginary ray that is assumed not to be diffracted by the diffracting lens structure and a ray that is diffracted by the diffractive lens structure, at a point on the diffractive lens structure where the height from the optical axis is h. In such an expression, if the diffraction order k is positive, a negative value of the second order coefficient $P_2$ represents a positive paraxial power of the diffractive lens structure. Further, the negative power increases with the distance from the optical axis, when the fourth order coefficient $P_4$ is positive.

An actual microscopic shape of the diffractive lens structure is defined by subtracting an integer multiple of the wavelength λ×m (m: integer) from Φ(h). The width of an annular zone is determined such that the difference between the optical path difference function Φ(h) at the inner edge of the annular zone and that at the outer edge of the same annular zone equals to one wavelength. Further, the step in the optical axis direction between the adjacent annular zones at the boundary thereof is determined to give an optical path difference of one wavelength to the incident beam.

The diffractive lens structure formed within the central area RC has a different function from that formed within the peripheral area RP. Therefore, the respective diffractive lens structures are defined by different optical path difference functions having different coefficients.

The diffractive lens structure formed within the central area RC satisfies the following condition (2):

$$-180 < (P_4 f_l^4)/k < -60 \quad (2)$$

where, $P_4$ is the coefficient of fourth order, fl is the focal length (unit: mm) of the objective lens 10 at the wavelength of the first laser beam, and k is the diffraction order as described above.

The condition (2) defines the correction effect of the spherical aberration achieved by the diffractive lens structure. Since the third order spherical aberration can be corrected by the optical path difference that is proportional to the fourth power of the incident height, it can be corrected by setting the fourth order coefficient $P_4$ of the optical-path difference function within an appropriate range satisfying the condition (2).

Further, the optical system including the objective lens 10 satisfies the following condition (3):

$$0.02 < (m_1 - m_2) \cdot f_l < 0.15 \quad (3)$$

where
- $m_1$ is the imaging magnification of the objective lens when the first optical disc is used; and
- $m_2$ is the imaging magnification of the objective lens when the second optical disc is used.

The condition (3) defines the variation of the distance to the beam emission point as the variation of the magnification. When the difference between the imaging magnifications satisfies the condition (3), the off-axis aberration can be reduced for both the first and second optical discs.

Four concrete embodiments of the objective lens 10 will be described hereinafter.

First Embodiment

Figure 3:
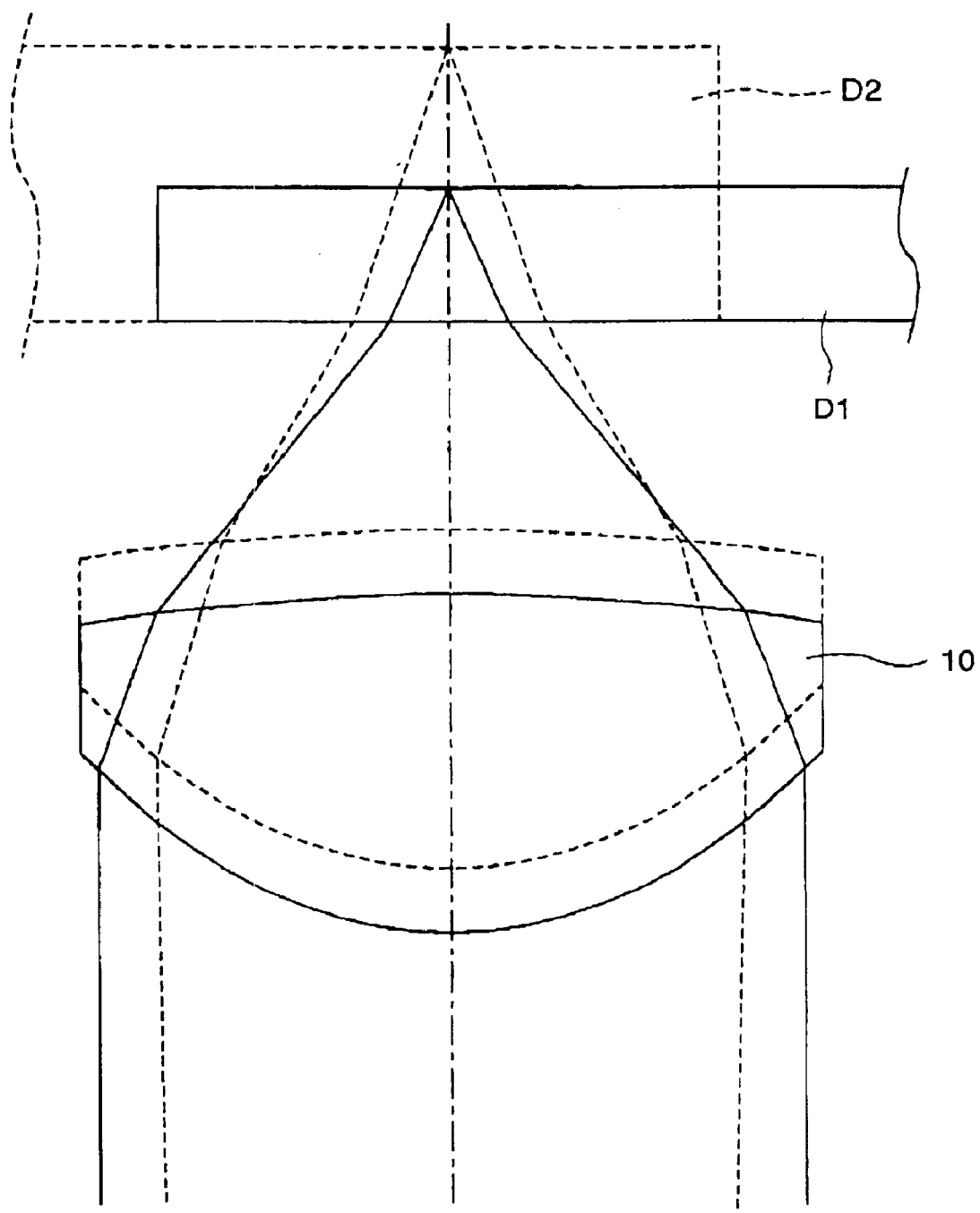
FIG. 3 is a lens diagram showing an objective lens of the optical pick-up according to a first embodiment and first and second optical discs.

FIG. 3 is a lens diagram showing the objective lens 10, which is included in the optical system of the optical pick-up according to the first embodiments the first optical disc $D_1$ and the second optical disc $D_2$. TABLE 1 shows the specific numerical construction of the objective lens 10 according to the first embodiment. The first surface 11 of the objective lens 10 according to the first embodiment is divided into the central area RC where a height h from the optical axis satisfies 0≦h<1.20 and the peripheral area RP where a height h from the optical axis satisfies 1.20≦h. While the diffractive lens structure is formed over the entire area of the first surface 11, the diffractive lens structures formed within the central area RC and the peripheral area RP are defined by different optical path difference functions, respectively. Further, a base curve, which is the shape of the surface of the refractive lens excluding the diffractive lens structure, of the central area RC and that of the peripheral area RP are rotationally-symmetrical aspherical surfaces defined by different coefficients, respectively. The second surface 12 is a rotationally-symmetrical aspherical surface which is not formed with a diffractive lens structure.

A rotationally-symmetrical aspherical surface is expressed by the following equation:

$$X(h) = \frac{ch^2}{1 + \sqrt{1 - (1+\kappa)c^2 h^2}} + A_4 h^4 + A_6 h^6 + A_8 h^8 + A_{10} h^{10} + A_{12} h^{12}$$

where, X(h) is a sag, which is a distance at a point on the surface, where a height from the optical axis is h, from a plane tangential to the surface at the optical axis thereof. Symbol c represents a curvature (1/r) of the surface at the optical axis, κ is a conic constant, $A_4$, $A_6$, $A_8$, $A_{10}$ and $A_{12}$ are aspherical surface coefficients of fourth, sixth, eighth, tenth and twelfth orders, respectively.

TABLE 1 shows radii of curvature r and aspherical coefficients of the base curves in the central area RC and the peripheral area RP of the first surface 11 and the second surface 12, various coefficients that define the diffractive lens structure with reference to the wavelength of the first laser beam, main diffraction orders $k_1$ and $k_2$, diffraction efficiencies $E_1$ and $E_2$ at the diffraction orders $k_1$ and $k_2$, a distance d between surfaces, a refractive index nd at d-line and Abbe number vd. In TABLE 1. $NA_1$, $f_l$, $OD_1$, $WD_1$ and $\phi_1$ represent a numerical aperture, a focal length (unit: mm) of the objective lens, an object distance (unit: mm), a working distance (unit: mm) and an effective diameter (unit: mm) when the first optical disc $D_1$ is used, respectively. $NA_2$, $OD_2$, $WD_2$ and $\phi_2$ represent a numerical aperture, an object distance, a working distance and an effective diameter when the second optical disc D2 is used, respectively. The object distance is a distance from an emission point of the light source (or an image of the emission point viewed from the objective lens) to the first surface 11 of the objective lens. When the divergent laser beam is incident on the objective lens, the object distance becomes positive, the convergent laser beam makes the object distance negative. A refractive index of the cover layers of the first and second optical discs is 1.5855 and Abbe number is 29.9.

TABLE 1

| $NA_1 = 0.60$ | $f_1 = 2.40$ | $OD_1 = \infty$ | $WD_1 = 1.20$ | $\phi_1 = 2.88$ |
| $NA_2 = 0.49$ | | $OD_2 = 60.6$ | $WD_2 = 0.93$ | $\phi_2 = 2.40$ |

| | First surface | | |
|---|---|---|---|
| | Central area ($0 \leq h < 1.20$) | Peripheral area ($1.20 \leq h < 1.44$) | Second surface |
| r | 1.542 | 1.575 | −5.400 |
| κ | −0.500 | −0.500 | 0.000 |
| A4 | $-4.6850 \times 10^{-3}$ | $2.8330 \times 10^{-1}$ | $4.0360 \times 10^{-2}$ |
| A6 | $-1.6870 \times 10^{-4}$ | $-8.5820 \times 10^{-4}$ | $-9.6860 \times 10^{-3}$ |
| A8 | $-4.0500 \times 10^{-4}$ | $4.1600 \times 10^{-5}$ | $-4.8500 \times 10^{-3}$ |
| A10 | $8.0600 \times 10^{-5}$ | $-6.5000 \times 10^{-5}$ | $2.9700 \times 10^{-3}$ |
| A12 | $-1.6370 \times 10^{-4}$ | $-1.4700 \times 10^{-4}$ | $-4.9200 \times 10^{-4}$ |
| $P_2$ | $-2.160 \times 10^{-1}$ | −1.156 | — |
| $P_4$ | −3.820 | $3.532 \times 10^{-1}$ | — |
| $P_6$ | $-3.900 \times 10^{-1}$ | $-2.200 \times 10^{-1}$ | — |
| $k_1/E_1$ | 1st order/98% | 5th order/100% | — |
| $k_2/E_2$ | 1st order/98% | 4th order/87% | — |
| d | | 1.50 | |
| nd | | 1.5436 | |
| νd | | 55.7 | |

FIG. 4 is a graph showing wavefront aberration when the first optical disc is used with the optical pick-up of the first embodiment. The vertical axis shows RMS value of the wavefront aberration (unit: wavelength) and the horizontal axis shows an image height (distance from optical axis) on the information layer of the optical disc. Further, FIG. 5 is a graph showing wavefront aberration when the second optical disc is used with the optical pick-up of the first embodiment. In both cases, the off-axis wavefront aberration is reduced, which maintains good off-axis performance.

The step in the optical axis direction between the adjacent annular zones of the diffractive lens structure is found by $k \times \lambda/(n-1)$ where k is a diffraction order, λ is a wavelength and n is a refractive index. The step of the diffractive lens structure in the central area RC is defined as an intermediate value between (a) the step calculated based on the wavelength of the first laser beam and the refractive index for the first laser beam and (b) the step calculated based on the wavelength of the second laser beam and the refractive index for the second laser beam. This design allows the objective lens to obtain high diffraction efficiency for both the first and second optical discs at the same diffraction order.

On the other hand, the step of the diffractive lens structure in the peripheral area RP is defined to achieve 100% diffraction efficiency when the first optical disc is used. This design raises the diffraction efficiency at the different diffraction order when the second optical disc is used. Since diffracted laser beams of the different diffraction orders are different in convergence/divergence to each other, a laser beam incident on the peripheral area RP reaches the positions that are different from a spot formed by a laser beam incident on the central area RC when the second optical disc is used. An aperture is required to cut off the incident beam onto the peripheral area when the second optical disc $D_2$ is used such that the beam spot does not become too small. The above described design gives the function of the aperture to the objective lens itself.

Second Embodiment

Figure 6:
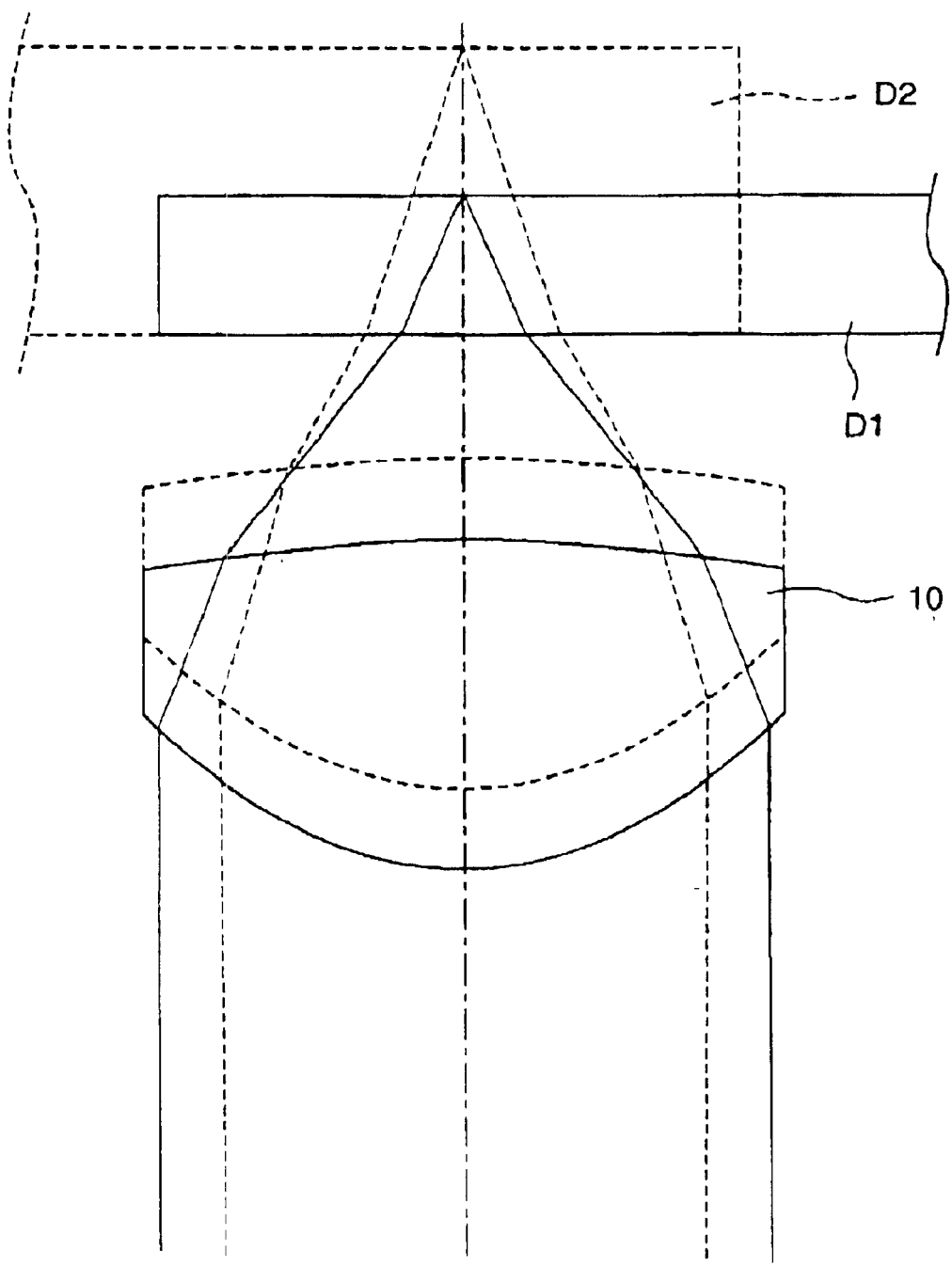
FIG. 6 is a lens diagram showing an objective lens of the optical pick-up according to a second embodiment and the first and second optical discs.

FIG. 6 is a lens diagram showing the objective lens, which is included in the optical system of the optical pick-up according to the second embodiment, the first optical disc $D_1$ and the second optical disc $D_2$. TABLE 2 shows the specific numerical construction of the objective lens 10 according to the second embodiment.

TABLE 2

| $NA_1 = 0.60$ | $f_1 = 2.00$ | $OD_1 = \infty$ | $WD_1 = 0.86$ | $\phi_1 = 2.40$ |
| $NA_2 = 0.47$ | | $OD_2 = 146.2$ | $WD_2 = 0.53$ | $\phi_2 = 1.92$ |

| | First surface | | |
|---|---|---|---|
| | Central area ($0 \leq h < 0.96$) | Peripheral area ($0.96 \leq h < 1.20$) | Second surface |
| r | 1.272 | 1.300 | −4.020 |
| κ | −0.500 | −0.500 | 0.000 |
| A4 | $-1.4945 \times 10^{-2}$ | $-1.1157 \times 10^{-2}$ | $8.0260 \times 10^{-2}$ |
| A6 | $-4.8150 \times 10^{-3}$ | $2.0610 \times 10^{-3}$ | $-4.2400 \times 10^{-2}$ |
| A8 | $-2.4740 \times 10^{-3}$ | $-3.4800 \times 10^{-3}$ | $7.2300 \times 10^{-3}$ |
| A10 | $1.0650 \times 10^{-3}$ | $2.7100 \times 10^{-3}$ | 0.0000 |
| A12 | $-1.0530 \times 10^{-3}$ | $-1.4660 \times 10^{-3}$ | 0.0000 |
| $P_2$ | 6.492 | $-1.103 \times 10^{-1}$ | — |
| $P_4$ | $-1.120 \times 10$ | −2.210 | — |
| $P_6$ | −3.220 | $-3.100 \times 10^{-1}$ | — |
| $k_1/E_1$ | 1st order/98% | 4th order/100% | — |
| $k_2/E_2$ | 1st order/98% | 3rd order/64% | — |
| d | | 1.40 | |
| nd | | 1.5436 | |
| νd | | 55.7 | |

Figure 7:
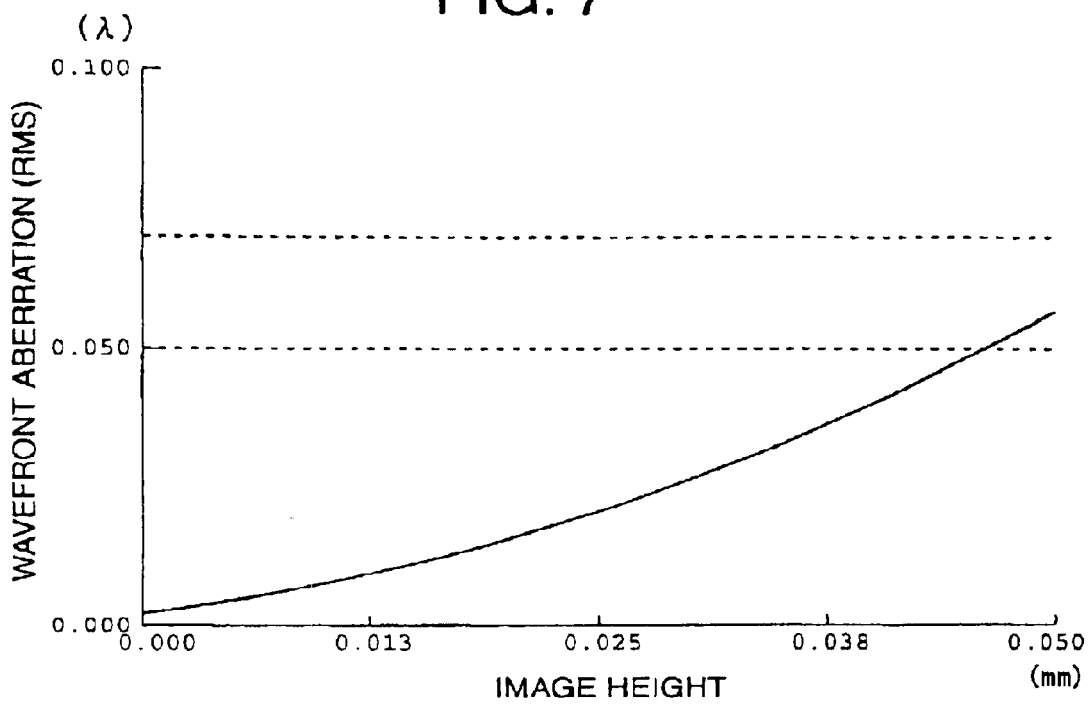
FIG. 7 is a graph showing wavefront aberration of the optical system of the optical pick-up according to the second embodiment with the first optical disc.
Figure 8:
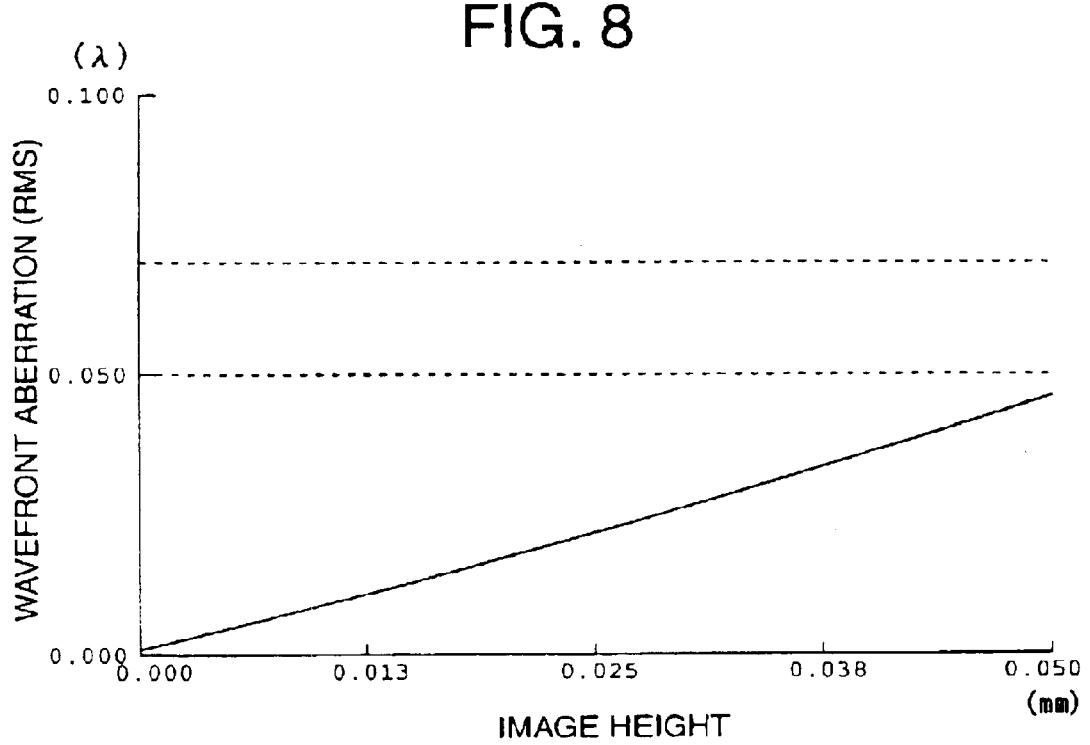
FIG. 8 is a graph showing wavefront aberration of the optical system of the optical pick-up according to the second embodiment with the second optical disc.

FIG. 7 is a graph showing wavefront aberration when the first optical disc is used with the optical pick-up of the second embodiment and FIG. 8 is a graph showing wavefront aberration when the second optical disc is used with the optical pick-up of the second embodiment. In both cases, the off-axis wavefront aberration is reduced, which maintains good off-axis performance.

Third Embodiment

Figure 9:
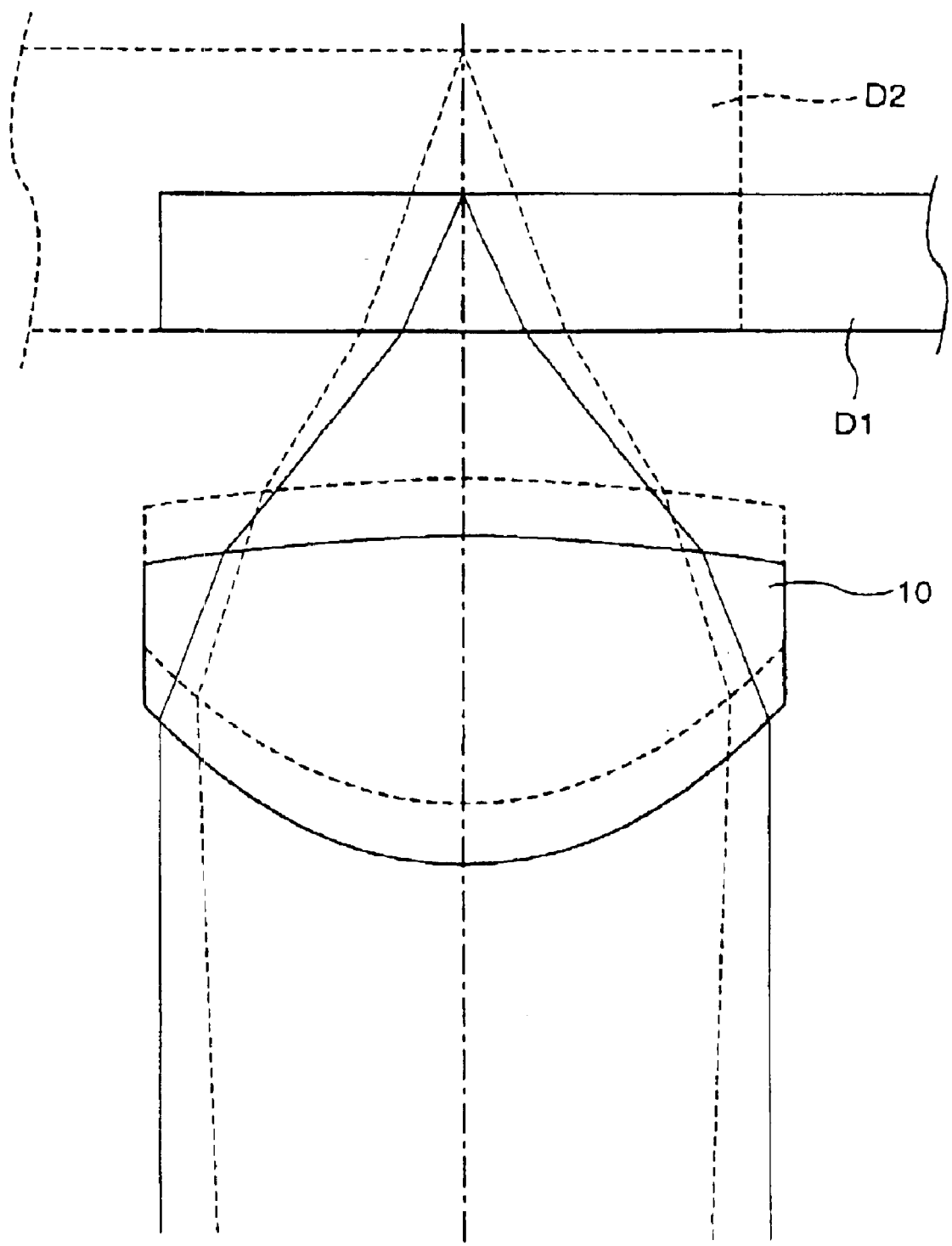
FIG. 9 is a lens diagram showing an objective lens of the optical pick-up according to a third embodiment and the first and second optical discs.

FIG. 9 is a lens diagram showing the objective lens, which is included in the optical system of the optical pick-up according to the third embodiment, the first optical disc $D_1$ and the second optical disc $D_2$. TABLE 3 shows the specific numerical construction of the objective lens 10 according to the third embodiment.

TABLE 3

| $NA_1 = 0.60$ | $f_1 = 2.00$ | $OD_1 = \infty$ | $WD_1 = 0.86$ | $\phi_1 = 2.40$ |
| $NA_2 = 0.49$ | | $OD_2 = 32.2$ | $WD_2 = 0.62$ | $\phi_2 = 2.10$ |

| | First surface | | |
|---|---|---|---|
| | Central area ($0 \leq h < 1.05$) | Peripheral Area ($1.05 \leq h < 1.20$) | Second surface |
| r | 1.310 | 1.300 | −4.020 |
| κ | −0.500 | −0.500 | 0.000 |
| A4 | $-5.8230 \times 10^{-3}$ | $-1.1157 \times 10^{-2}$ | $8.0260 \times 10^{-2}$ |
| A6 | $7.4200 \times 10^{-5}$ | $2.0610 \times 10^{-3}$ | $-4.2400 \times 10^{-2}$ |
| A8 | $-3.1470 \times 10^{-3}$ | $-3.4800 \times 10^{-3}$ | $7.2300 \times 10^{-3}$ |
| A10 | $2.2840 \times 10^{-3}$ | $2.7100 \times 10^{-3}$ | 0.0000 |
| A12 | $-1.3500 \times 10^{-3}$ | $-1.4660 \times 10^{-3}$ | 0.0000 |
| $P_2$ | −2.845 | $-1.470 \times 10^{-1}$ | — |
| $P_4$ | −4.760 | −2.947 | — |
| $P_6$ | $-7.460 \times 10^{-1}$ | $4.133 \times 10^{-1}$ | — |
| $k_1/E_1$ | 1st order/98% | 3rd order/100% | — |
| $k_2/E_2$ | 1st order/98% | 3rd order/44% | — |
| d | | 1.40 | |
| nd | | 1.5436 | |
| νd | | 55.7 | |

Figure 10:
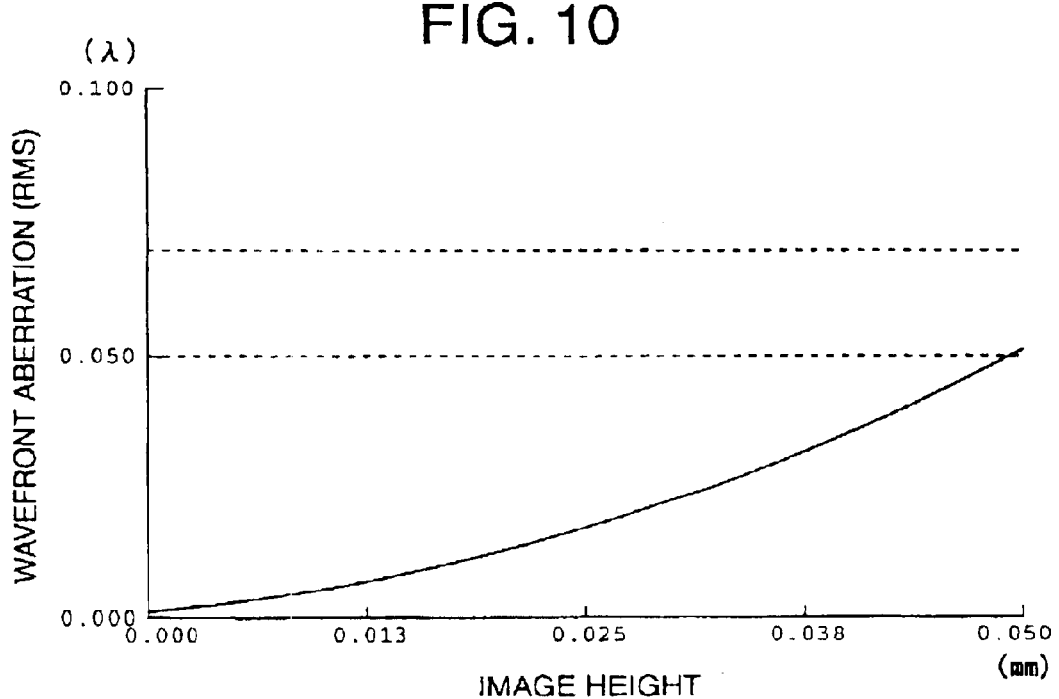
FIG. 10 is a graph showing wavefront aberration of the optical system of the optical pick-up according to the third embodiment with the first optical disc.
Figure 11:
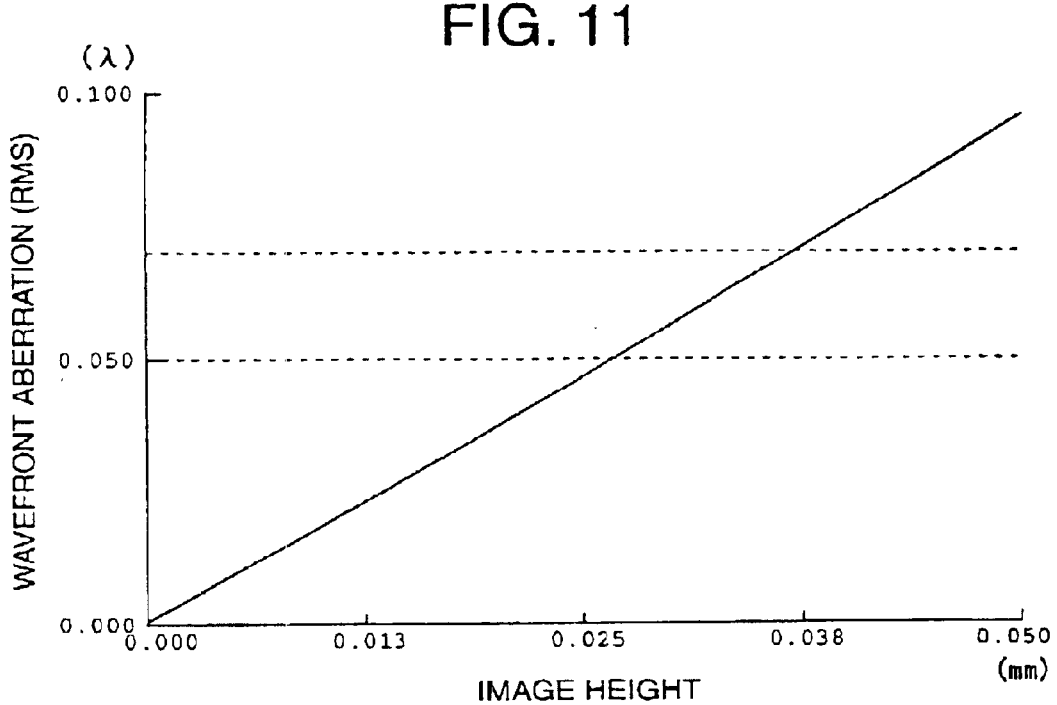
FIG. 11 is a graph showing wavefront aberration of the optical system of the optical pick-up according to the third embodiment with the second optical disc.

FIG. 10 is a graph showing wavefront aberration when the first optical disc is used with the optical pick-up of the third embodiment and FIG. 11 is a graph showing wavefront aberration when the second optical disc is used with the optical pick-up of the third embodiment. In both cases, the off-axis wavefront aberration is reduced, which maintains good off-axis performance.

Fourth Embodiment

Figure 12:
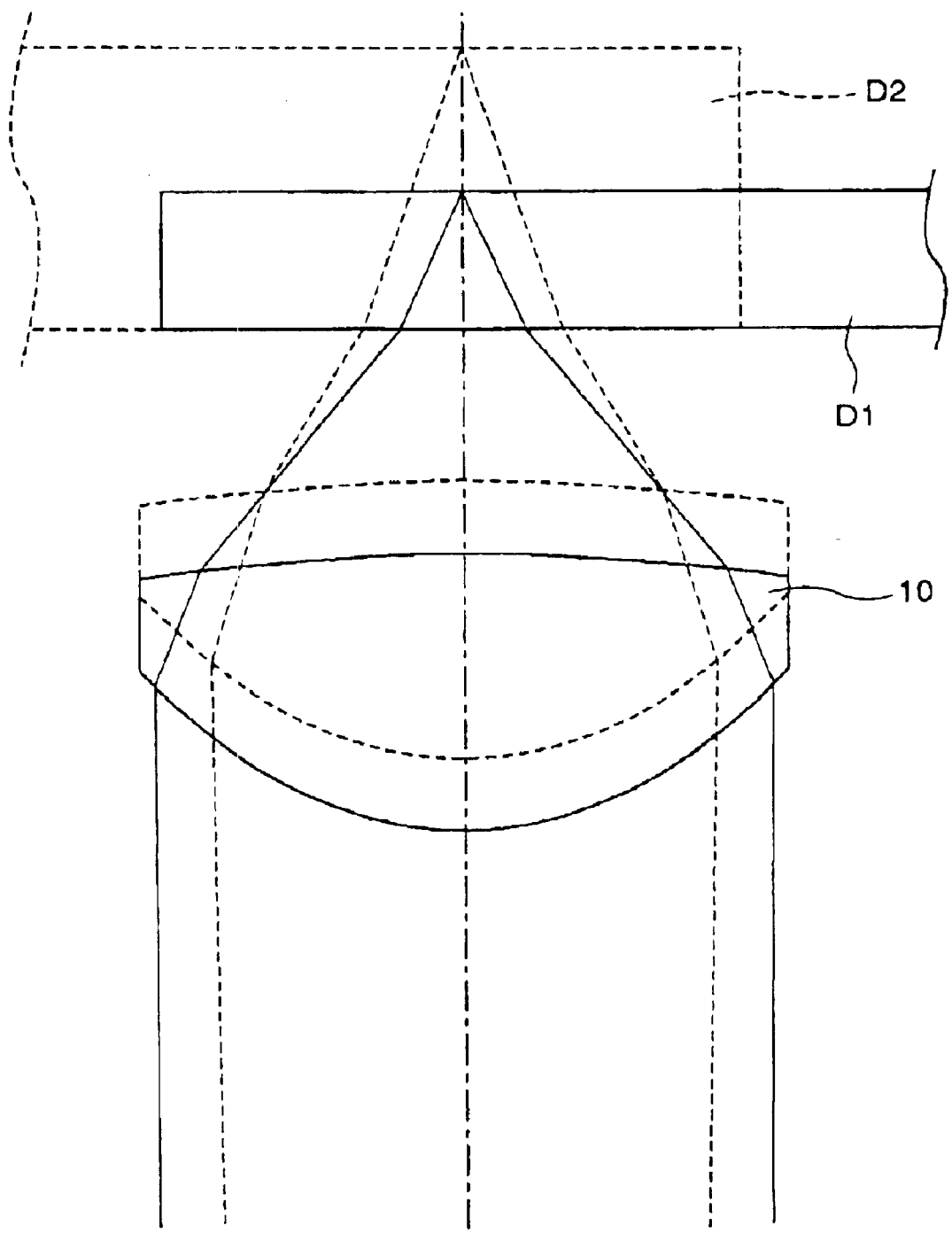
FIG. 12 is a lens diagram showing an objective lens of the optical pick-up according to a fourth embodiment and the first and second optical discs.

FIG. 12 is a lens diagram showing the objective lens, which is included in the optical system of the optical pick-up according to the fourth embodiment, the first optical disc $D_1$ and the second optical disc $D_2$. TABLE 4 shows the specific numerical construction of the objective lens 10 according to the fourth embodiment.

TABLE 4

$NA_1 = 0.60$ $\quad f_1 = 2.00$ $\quad OD_1 = 240.0$ $\quad WD_1 = 0.98$ $\quad \phi_1 = 2.44$
$NA_2 = 0.48$ $\qquad\qquad\qquad\quad OD_2 = 59.8$ $\quad\; WD_2 = 0.66$ $\quad \phi_2 = 2.00$ First surface

| | Central area (0 ≦ h < 1.00) | Peripheral area (1.00 ≦ h < 1.22) | Second surface |
|---|---|---|---|
| r | 1.256 | 1.276 | −4.780 |
| κ | −0.500 | −0.500 | 0.000 |
| A4 | −1.0940 × 10⁻² | −6.7990 × 10⁻³ | 6.7320 × 10⁻² |
| A6 | −2.0900 × 10⁻³ | 2.7000 × 10⁻³ | −3.1540 × 10⁻² |
| A8 | −4.1840 × 10⁻³ | −6.5520 × 10⁻³ | 4.0300 × 10⁻³ |
| A10 | 2.8800 × 10⁻³ | 5.0600 × 10⁻³ | 0.0000 |
| A12 | −1.8000 × 10⁻³ | −2.3300 × 10⁻³ | 0.0000 |
| $P_2$ | 4.610 | −5.000 × 10⁻¹ | — |
| $P_4$ | −9.000 | −6.000 | — |
| $P_6$ | −2.500 | −4.000 × 10⁻¹ | — |
| $k_1/E_1$ | 1st order/98% | 1st order/100% | — |
| $k_2/E_2$ | 1st order/98% | 1st order/92% | — |
| d | | 1.20 | |
| nd | | 1.5436 | |
| νd | | 55.7 | |

Figure 13:
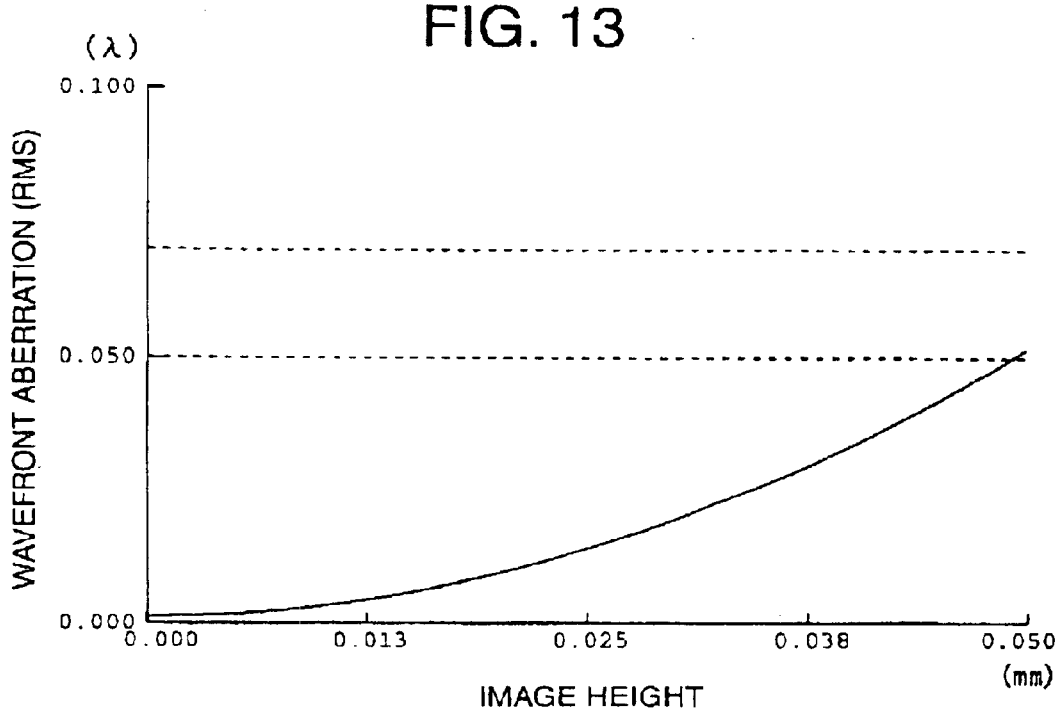
FIG. 13 is a graph showing wavefront aberration of the optical system of the optical pick-up according to the fourth embodiment with the first optical disc.
Figure 14:
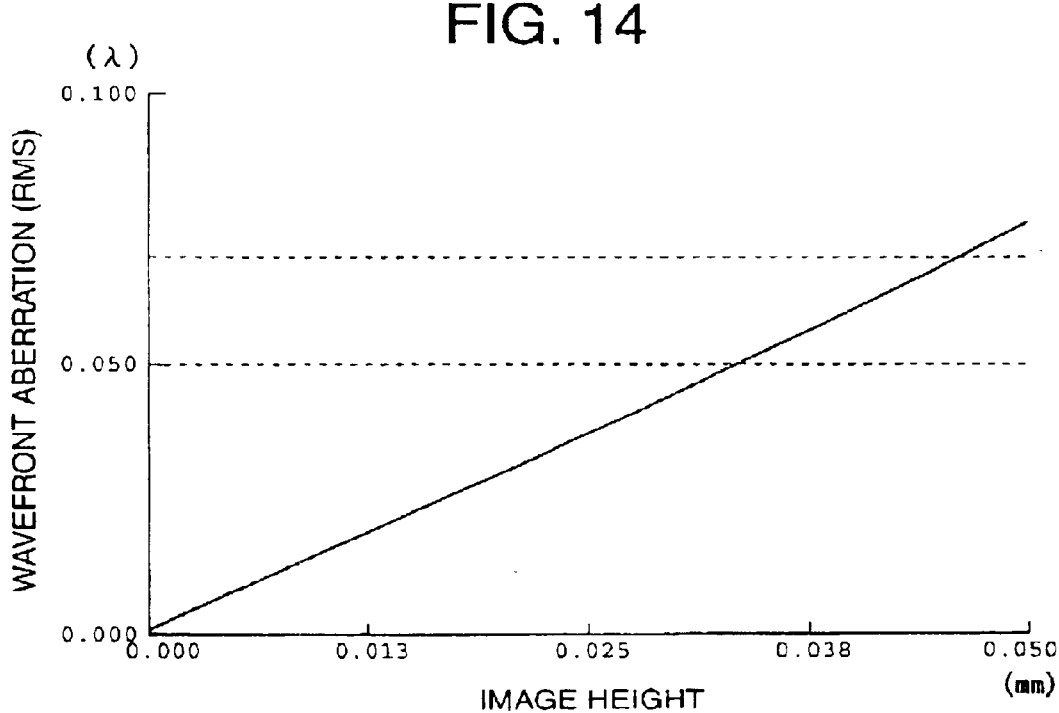
FIG. 14 is a graph showing wavefront aberration of the optical system of the optical pick-up according to the fourth embodiment with the second optical disc.

FIG. 13 is a graph showing wavefront aberration when the first optical disc is used with the optical pick-up of the fourth embodiment and FIG. 14 is a graph showing wavefront aberration when the second optical disc is used with the optical pick-up of the fourth embodiment. In both cases, the off-axis wavefront aberration is reduced, which maintains good off-axis performance.

The following TABLE 5 shows relationships between each embodiment and the conditions (1) through (3). Since all the embodiments satisfy the condition (1) through (3), the spherical aberration due to change of the cover layer of the optical disc is corrected well and enough working distance can be kept when the second optical disc having a thicker cover layer is used.

TABLE 5

| | Condition (1) $0.01 < \Delta SA \cdot (f_1/\phi_2)^2 < 0.03$ | Condition (2) $-180 < (P_4 \cdot f_1^4)/k < -60$ | Condition (3) $0.02 < (m_1 - m_2) \cdot f_1 < 0.15$ |
|---|---|---|---|
| First embodiment | 0.018 | −126.7 | 0.099 |
| Second embodiment | 0.028 | −179.4 | 0.028 |
| Third embodiment | 0.011 | −76.2 | 0.132 |
| Fourth embodiment | 0.024 | −144.0 | 0.053 |

As described above, the present invention provides an improved optical pick-up that counters the spherical aberration caused by a difference in thickness of the cover layer with a variation of the divergence of the laser beam incident on the objective lens and a variation of the spherical aberration of the diffractive lens structure. Since the correction effect by the variation of the divergence is limited to a part of the total correction effect, the spherical aberration can be corrected while maintaining good off-axis performance. Further, a sufficient working distance can be obtained for the second optical disc having a thicker cover layer.

The present disclosure relates to the subject matter contained in Japanese Patent Application No. 2001-354887, filed on Nov. 20, 2001, which is expressly incorporated herein by reference in its entirety.

What is claimed is:

1. An optical system for an optical pick-up comprising:

a light source that selectively emits a first laser beam and a second laser beam, a wavelength of the second laser beam being longer than that of the first laser beam; and an objective lens that converges the first laser beam onto an information layer of a first optical disc through a cover layer thereof and converges the second laser beam onto an information layer of a second optical disc through a cover layer thereof, the second optical disc having lower recording density and a thicker cover layer than the first optical disc, wherein said light source is designed such that the divergence of the second laser beam incident on said objective lens is larger than that of the first laser beam thereby correcting part of spherical aberration caused by a difference in thicknesses of the cover layers, wherein at least one surface of said objective lens is divided into a central area, through which a laser beam of low NA that is necessary and sufficient for the second optical disc, passes and a peripheral area, through which a laser beam of high NA that is necessary only for the first optical disc, passes, and wherein a diffractive lens structure that changes spherical aberration in accordance with wavelength is formed within at least said central area so that the residual part of the spherical aberration caused by the difference in thicknesses of the cover layers is corrected for as the wavelength of the laser beam is switched;

wherein said objective lens is configured to satisfy the condition:

$$0.01 < \Delta SA \cdot (f_1/\phi_2)^2 < 0.03$$

where, $\Delta SA$ is the residual spherical aberration (unit: mm) at the edge of the effective diameter in said central area when a laser beam whose wavelength is equal to said first laser beam and whose divergence is equal to said second laser beam is incident on said second optical disc, $f_1$ is a focal length (unit: mm) of said objective lens at the wavelength of said first laser beam, and $\phi_2$ is the maximum diameter (unit: mm) of said central area.

2. An optical system for an optical pick-up comprising:

a light source that selectively emits a first laser beam and a second laser beam, a wavelength of the second laser beam being longer than that of the first laser beam; and an objective lens that converges the first laser beam onto an information layer of a first optical disc through a cover layer thereof and converges the second laser beam onto an information layer of a second optical disc through a cover layer thereof, the second optical disc having lower recording density and a thicker cover layer than the first optical disc, wherein said light source is designed such that the divergence of the second laser beam incident on said objective lens is larger than that of the first laser beam thereby correcting part of spherical aberration caused by a difference in thicknesses of the cover layers, wherein at least one surface of said objective lens is divided into a central area, through which a laser beam of low NA that is necessary and sufficient for the second optical disc, passes and a peripheral area, through which a laser beam of high NA that is necessary only for the first optical disc, passes, and wherein a diffractive lens structure that changes spherical aberration in accordance with wavelength is formed within at least said central area so that the residual part of the spherical aberration caused by the difference in thicknesses of the cover layers is corrected for as the wavelength of the laser beam is switched;

wherein the following condition is satisfied;

$$-180 < (P_4 \cdot f_1^4)/k < -60$$

when an additional optical path length added by said diffractive lens structure is expressed by the following optical path difference function $\Phi(h)$:

$$\Phi(h) = (P_2 h^2 + P_4 h^4 + P_6 h^6 + \ldots) \times k \times \lambda$$

where, $f_1$ is a focal length (unit: mm) of said objective lens at the wavelength of said first laser beam, $P_2$, $P_4$ and $P_6$ are coefficients of second, fourth and sixth orders, h is a height from the optical axis, k is a diffraction order, and $\lambda$ is a working wavelength.

3. An optical system for an optical pick-up comprising:

a light source that selectively emits a first laser beam and a second laser beam, a wavelength of the second laser beam being longer than that of the first laser beam; and an objective lens that converges the first laser beam onto an information layer of a first optical disc through a cover layer thereof and converges the second laser beam onto an information layer of a second optical disc through a cover layer thereof, the second optical disc having lower recording density and a thicker cover layer than the first optical disc, wherein said light source is designed such that the divergence of the second laser beam incident on said objective lens is larger than that of the first laser beam thereby correcting part of spherical aberration caused by a difference in thicknesses of the cover layers, wherein at least one surface of said objective lens is divided into a central area, through which a laser beam of low NA that is necessary and sufficient for the second optical disc, passes and a peripheral area, through which a laser beam of high NA that is necessary only for the first optical disc, passes, and wherein a diffractive lens structure that changes spherical aberration in accordance with wavelength is formed within at least said central area so that the residual part of the spherical aberration caused by the difference in thicknesses of the cover layers is corrected for as the wavelength of the laser beam is switched;

wherein the following condition is satisfied;

$$0.02 < (m_1 - m_2) \cdot f_1 < 0.15$$

where, $f_1$ is a focal length (unit: mm) of said objective lens at the wavelength of said first laser beam, $m_1$ is the imaging magnification of said objective lens when said first optical disc is used, and $m_2$ is the imaging magnification of said objective lens when said second optical disc is used.

4. An optical system of an optical pick-up comprising:

a light source portion that selectively emits a first laser beam and a second laser beam whose wavelength is longer than that of said first laser beam; and an objective lens for converging said first laser beam onto an information layer of a first optical disc through a cover layer thereof and for converging said second laser beam onto an information layer of a second optical disc through a cover layer thereof, said second optical disc having lower recording density and a thicker cover layer than said first optical disc, wherein the following condition is satisfied;

$$0.02 < (m_1 - m_2) \cdot f_1 < 0.15$$

where, $f_1$ is a focal length (unit: mm) of said objective lens at the wavelength of said first laser beam, $m_1$ is the imaging magnification of said objective lens when said first optical disc is used, and $m_2$ is the imaging magnification of said objective lens when said second optical disc is used.

5. An objective lens that converges a first laser beam onto an information layer of a first optical disc through a cover layer thereof and converges a second laser beam whose wavelength is longer and whose divergence is larger than said first laser beam onto a second optical disc having lower recording density and a thicker cover layer than said first optical disc through the cover layer thereof, said objective lens comprising;

a refractive lens having a positive refractive power, a surface of said refractive lens being divided into a central area through which a laser beam of low NA, which is necessary and sufficient for said second optical disc, passes and a peripheral area through which a laser beam of high NA, which is necessary only for said first optical disc, passes; and a diffractive lens structure that changes spherical aberration in accordance with wavelength is formed within at least said central area to correct a part of the spherical aberration caused by a difference in thickness of said cover layer;

wherein said objective lens satisfies the condition:

$$0.01 < \Delta SA \cdot (f_1/\phi_2)^2 < 0.03$$

where, $\Delta SA$ is the residual spherical aberration (unit: mm) at the edge of the effective diameter in said central area when a laser beam whose wavelength is equal to said first laser beam and whose divergence is equal to said second laser beam is incident on said second optical disc, $f_1$ is a focal length (unit: mm) of said objective lens at the wavelength of said first laser beam, and $\phi_2$ is the maximum diameter (unit: mm) of said central area.

6. An objective lens that converges a first laser beam onto an information layer of a first optical disc through a cover layer thereof and converges a second laser beam whose wavelength is longer and whose divergence is larger than said first laser beam onto a second optical disc having lower recording density and a thicker cover layer than said first optical disc through the cover layer thereof, said objective lens comprising:

a refractive lens having a positive refractive power, a surface of said refractive lens being divided into a central area through which a laser beam of low NA, which is necessary and sufficient for said second optical disc, passes and a peripheral area through which a laser beam of high NA, which is necessary only for said first optical disc, passes; and a diffractive lens structure that changes spherical aberration in accordance with wavelength is formed within at least said central area to correct a part of the spherical aberration caused by a difference in thickness of said cover layer;

wherein the following condition is satisfied;

$$-180 < (P_4 \cdot f_I^4)/k < -60$$

when an additional optical path length added by said diffractive lens structure is expressed by the following optical path difference function $\Phi(h)$:

$$\Phi(h) = (P_2 h^2 + P_4 h^4 + P_6 h^6 + \ldots) \times k \times \lambda$$

where, $f_I$ is a focal length (unit: mm) of said objective lens at the wavelength of said first laser beam, $P_2$, $P_4$ and $P_6$ are coefficients of second, fourth and sixth orders, h is a height from the optical axis, k is a diffraction order, and $\lambda$ is a working wavelength.

7. An objective lens that converges a first laser beam onto an information layer of a first optical disc through a cover layer thereof and converges a second laser beam whose wavelength is longer and whose divergence is larger than said first laser beam onto a second optical disc having lower recording density and a thicker cover layer than said first optical disc through the cover layer thereof, said objective lens comprising:

a refractive lens having a positive refractive power, a surface of said refractive lens being divided into a central area through which a laser beam of low NA, which is necessary and sufficient for said second optical disc, passes and a peripheral area through which a laser beam of high NA, which is necessary only for said first optical disc, passes; and a diffractive lens structure that changes spherical aberration in accordance with wavelength is formed within at least said central area to correct a part of the spherical aberration caused by a difference in thickness of said cover layer;

wherein the following condition is satisfied;

$$0.02 < (m_1 - m_2) \cdot f_I < 0.15$$

where, $f_I$ is a focal length (unit: mm) of said objective lens at the wavelength of said first laser beam, $m_1$ is the imaging magnification of said objective lens when said first optical disc is used, and $m_2$ is the imaging magnification of said objective lens when said second optical disc is used.

8. An objective lens that converges a first laser beam onto an information layer of a first optical disc through a cover layer thereof and converges a second laser beam whose wavelength is longer and whose divergence is larger than that of said first laser beam onto a second optical disc having lower recording density and a thicker cover layer than said first optical disc through the cover layer thereof, said objective lens satisfies a condition:

$$0.02 < (m_1 - m_2) \cdot f_I < 0.15$$

where, $f_I$ is a focal length (unit: mm) of said objective lens at the wavelength of said first laser beam, $m_1$ is the imaging magnification of said objective lens when said first optical disc is used, and $m_2$ is the imaging magnification of said objective lens when said second optical disc is used.

9. An optical system of an optical pick-up comprising:

a light source portion that selectively emits a first laser beam and a second laser beam whose wavelength is longer than that of said first laser beam; and an objective lens for converging said first laser beam onto an information layer of a first optical disc through a cover layer thereof and for converging said second laser beam onto an information layer of a second optical disc through a cover layer thereof, said second optical disc having lower recording density than said first optical disc, wherein the following condition is satisfied;

$$0.02 < (m_1 - m_2) \cdot f_I < 0.15$$

where, $f_I$ is a focal length (unit: mm) of said objective lens at the wavelength of said first laser beam, $m_1$ is the imaging magnification of said objective lens when said first optical disc is used, and $m_2$ is the imaging magnification of said objective lens when said second optical disc is used.

10. An objective lens that converges a first laser beam onto an information layer of a first optical disc through a cover layer thereof and converges a second laser beam whose wavelength is longer and whose divergence is larger than that of said first laser beam onto a second optical disc having lower recording density than said first optical disc through the cover layer thereof, said objective lens satisfies a condition:

$$0.02 < (m_1 - m_2) \cdot f_I < 0.15$$

where, $f_I$ is a focal length (unit: mm) of said objective lens at the wavelength of said first laser beam, $m_1$ is the imaging magnification of said objective lens when said first optical disc is used, and $m_2$ is the imaging magnification of said objective lens when said second optical disc is used.

* * * * *